United States Patent [19]

Snickers

[11] Patent Number: 5,000,423

[45] Date of Patent: Mar. 19, 1991

[54] SMALL VEHICLE LIFT

[76] Inventor: Gordon E. Snickers, 8882 Swan Lake Rd., Alborn, Minn. 55702

[21] Appl. No.: 433,836

[22] Filed: Nov. 9, 1989

[51] Int. Cl.[5] .......... B60P 1/16; B66F 3/00

[52] U.S. Cl. .......... 254/88; 254/131

[58] Field of Search .......... 254/131, 88, 90-91, 254/47, 99; 211/17, 22; 187/8.43, 8.47

[56] References Cited

U.S. PATENT DOCUMENTS

| | | | |
|---|---|---|---|
| 711,008 | 10/1902 | Scott . | |
| 1,271,584 | 7/1918 | Klemme | 254/88 |
| 1,510,209 | 9/1924 | Christman . | |
| 2,567,672 | 9/1951 | Lawless . | |
| 3,747,778 | 7/1973 | Collins, Jr. . | |
| 3,838,783 | 10/1974 | Tune . | |
| 3,863,890 | 2/1975 | Ruffiny | 254/88 |
| 3,964,729 | 6/1976 | Harlow | 254/131 |
| 4,077,602 | 3/1978 | Lovelady | 254/88 |
| 4,088,303 | 5/1978 | Aquila | 254/88 |
| 4,120,485 | 10/1978 | McConnell | 254/88 |
| 4,238,114 | 12/1980 | Mylioriti | 254/88 |

*Primary Examiner*—Robert C. Watson

*Attorney, Agent, or Firm*—Peterson, Wicks, Nemer & Kamrath

[57] ABSTRACT

A lift for raising or tilting a small vehicle such as a riding lawn mower is disclosed including first and second ramps. The ramps each include an angled portion connected to a horizontal portion in turn connected to a vertical portion. The ramps are held by legs which extend from the vertical portion and which in the preferred form are removably pivotably mounted for ease of assembly and storage. T-shaped levers are pivotally mounted to the upper free ends of the vertical portions and generally include a first bar having a first end pivotably mounted to the ramps and a second bar having a first end conntected to the first bar intermediate its ends. In the most preferred form, the levers are pivotably mounted to the ramps by a cylindrical bar rotatably and slideably received in collars formed on the levers and ramps, with the cylindrical bar also holding the ramps in a spaced, parallel relation. Straps interconnect the free ends of the first bars of the levers with the vehicle. Thus, as the levers are pivoted from a position where the first bar is generally horizontal to a central position, the vehicle is pulled by a force directed forward and up and as the levers are pivoted from the central position to an overcenter position, the vehicle is pulled with a force directed forward and downward.

17 Claims, 1 Drawing Sheet

SMALL VEHICLE LIFT

BACKGROUND

The present invention generally relates to lifts, specifically to lifts for small vehicles, and particularly to lifts for small vehicles such as lawn mowers, all terrain vehicles, and the like.

While servicing and repairing lawn mowers and like small vehicles, it is necessary to work underneath the vehicle which due to the low clearance has little access while the vehicle is normally parked. Often the vehicles were simply manually tipped on their sides resulting in loss of oil and/or fluid from the engine, battery, transmission, or gas tank. Also, the vehicles were tilted by raising an end of the vehicle utilizing a fork lift or loader. Although lifts and work tables exist for this purpose, existing lifts and work tables are very cumbersome, expensive, and nonportable. Thus, their utilization has been severely restricted to only a few limited applications. Thus, a need exists to provide a lift which overcomes the deficiencies of prior lifts and work tables and which is inexpensive, versatile, and portable.

SUMMARY

The present invention solves this need and other problems in the field of small vehicle lifts by providing, in the preferred form, a lever pivotally mounted to a ramp and which pulls the vehicle up the ramp. In a first aspect of the present invention, the lever is pivotable between a generally horizontal position, a central position, and an overcenter position such that as the lever is pivoted, the lever pulls the vehicle along an arc up and forward on the ramp as the lever moves from the generally horizontal position to the central position and pulls the vehicle along an arc forward and downwardly on the ramp as the lever is pivoted from the central position to the overcenter position.

In another aspect of the present invention, the lever is pivotably mounted by a cylindrical bar which is slideably and rotatably received in collars formed on the ramp and the lever. Further, the cylindrical bar holds the first and second ramps and holds the first and second levers in spaced parallel relations to each other.

It is thus an object of the present invention to provide a novel lift for small vehicles.

It is further an object of the present invention to provide such a novel small vehicle lift which is portable.

It is further an object of the present invention to provide such a novel small vehicle lift which may be folded compactly for storage and/or transport.

It is further an object of the present invention to provide such a novel small vehicle lift which may be easily assembled and disassembled.

It is further an object of the present invention to provide such a novel small vehicle lift which can be shipped in a relatively small carton.

It is further an object of the present invention to provide such a novel small vehicle lift which may be easily adjusted to fit vehicles having varied wheel spacing.

It is further an object of the present invention to provide such a novel small vehicle lift which may be fabricated from readily available stock materials.

It is further an object of the present invention to provide such a novel small vehicle lift which may be fabricated with tools readily available in most machine shops.

It is further an object of the present invention to provide such a novel small vehicle lift which is lightweight but having a strength able to lift small vehicles.

It is further an object of the present invention to provide such a novel small vehicle lift able to be rapidly and easily secured to the vehicle without marring or scratching.

It is further an object of the present invention to provide such a novel small vehicle lift which initially pulls the vehicle with an upward and forward force.

It is further an object of the present invention to provide such a novel small vehicle lift allowing open access to the front and sides of the vehicle.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
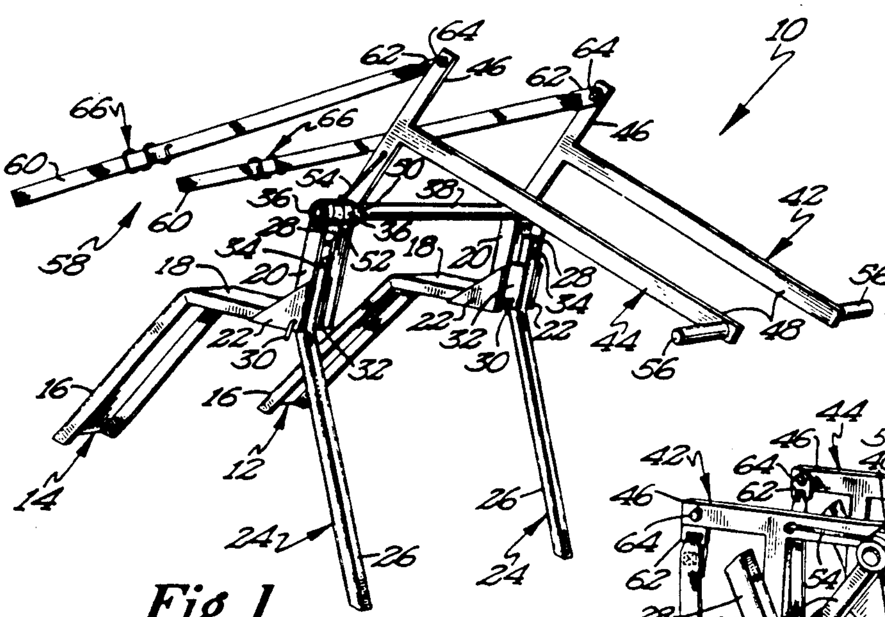
FIG. 1 shows a perspective view of a small vehicle lift according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inside", "outside", "inward", "outward", "end", "front", "bottom", "top", "vertical", "horizontal", "side", "forward", "rearward", "rear", and similar terms are used herein, it should be understood that these terms have reference only to the structure shown in the drawings as it would appear to a person viewing the drawings and are utilized only to facilitate describing the invention.

DESCRIPTION

A lift for small vehicles such as riding lawn mowers according to the preferred teachings of the present invention is shown in the drawings and generally designated 10. Lift 10 generally includes first and second ramps 12 and 14. Ramps 12 and 14 generally include a tread including a first angled portion 16 and a second generally horizontal portion 18 which in the preferred form are at an angle in the order of 135° from each other.

Upstanding from the free end of portion 18 is a generally vertical portion 20. In the most preferred form, portions 16, 18 and 20 are formed of a single piece of channel steel (1"×8"×0.125", 2.5 cm. ×20.3 cm.×0.3 cm.) bent into the preferred configuration. Specifically, the sides of the channel steel are notched and welded together to form the angle between portions 16 and 18. The sides of the channel are cut and angular braces 22 extend between and are welded to portions 18 and 20 to form the angle between portions 18 and 20.

Ramps 12 and 14 further include legs 24 for holding the treads. Specifically, legs 24 in the most preferred form are formed of steel tubing (1.5"×0.125", 3.8 cm.×0.3 cm.) which is bent at an angle in the order of 10° to define straight portions 26 and 28. Portions 28 of legs 24 are pivotally mounted to portions 20 about an axis adjacent the interconnection with portions 18 and adjacent portions 26. In the most preferred form, legs 24 are pivotally mounted by pins 30 extending through braces 22 and the sides of portions 20, through portions 26 of legs 24, and ears 32 extending from portions 20 generally parallel to the sides of portions 20. In the most preferred form, legs 24 may be pivoted such that portion 28 is generally parallel to and abuts with portion 20 and with portion 26 extending at an angle of 100° from portion 18. The upper end of portion 28 is removably secured to portion 20 such as by a bolt 34 extending through portions 20 and 28.

Ramps 12 and 14 further include aligned but spaced collars 36 attached to the upper free ends of portion 20. Ramps 12 and 14 are held in a spaced, parallel relation by a cylindrical bar 38 slideably received in collars 36 of ramps 12 and 14 and removably secured therein such as by cotter pins 40. It can be appreciated that bar 38 may include a series of apertures to receive cotter pins 40 to allow ramps 12 and 14 to be spaced at a variety of widths to correspond to the wheels of the vehicle desired to be lifted.

Lift 10 further includes first and second lift levers 42 and 44 pivotally mounted to ramps 12 and 14, respectively. In the most preferred form, levers 42 and 44 are T-shaped and include a first bar 46 and an elongated second bar 48 having a first end interconnected generally perpendicular to first bar 46 intermediate its ends. A collar 50 is secured to the lower end of first bar 46 for slideable and rotatable receipt on bar 38 adjacent the inside collars 36 of ramps 12 and 14. A collar 52 slideably and rotatably received on bar 38 intermediate the first and second collars 36 of ramps 12 and 14 is attached to bar 46 by an angular brace 54. It can then be appreciated that collar 52 axially captured between first and second collars 36 prevent levers 42 and 44 from sliding along bar 38. Handles 56 are provided adjacent the free ends of second bars 48 of levers 42 and 44 extending generally perpendicularly outward and parallel to bar 38. In the most preferred form, bars 46 have a length generally equal to the length of portion 18 of ramps 12 and 14.

Lift 10 further includes provisions 58 for removable securement to the vehicle. In the most preferred form, provisions 58 include an elongated flaccid member 60 such as a nylon web strap. The first end of strap 60 includes a metal clip 62 for pivotal attachment to the upper, free end of bar 46 such as by a bolt 64. Strap 60 further includes a serpentine-shaped metal clip 66 allowing non-slip, removable securement to the vehicle. Specifically, clip 66 is formed by bending a length of steel wire to form a first leg 68 which is connected to a second leg 70 by a semicircular arcuate portion 72, with leg 70 being parallel to leg 68. Second leg 70 is connected to a third leg 74 by a semicircular arcuate portion 76, with leg 74 being parallel to leg 70. Third leg 74 is connected to a fourth leg 78 by a semicircular arcuate portion 80, with leg 78 being parallel to leg 74. Fourth leg 78 is connected to a fifth leg 82 by a semicircular arcuate portion 84, with leg 78 being parallel to leg 82. Fifth leg 82 is connected to a sixth leg 86 by a semicircular arcuate portion 88, with leg 86 being parallel to leg 84. Leg 86 is parallel to and engages leg 78 such that legs 78, 82 and 86 and arcuate portions 84 and 88 define a closed loop. Clip 66 is planar such that legs 68, 70, 74, 78, 82, and 86 and arcuate portions 72, 76, 80, 84, and 88 are located in the same plane.

Now that the basic construction of lift 10 according to the preferred teachings of the present invention has been explained, the use and subtle features of lift 10 can be set forth and appreciated. Specifically, the vehicle and lift 10 are positioned such that the wheels of the vehicle are aligned with ramps 12 and 14. Levers 42 and 44 may then be pivoted upwardly such that bars 48 are generally vertical but overcenter of bar 38 and bars 46 are generally horizontal and overlying portions 18 of ramps 12 and 14. It can be appreciated that levers 42 and 44 will remain in this position due to brace 54 hitting portion 20 intermediate first and second collars 36 and the overcenter positioning of bars 48. Straps 60 may then be secured to the vehicle. For example, strap 60 may extend through the loop of clip 66 and then be looped around a portion of the vehicle such as the axle. At that time, the free end of strap 60 may be again extended through the loop of clip 66. The double thickness of strap 60 overlying itself may then be weaved around legs 68, 70, 74, and 78. For example, the double thickness of strap 60 may pass over legs 70 and 78 and under legs 68 and 76. It can then be appreciated that clip 66 will hold strap 60 together such that the axle is securely held in the loop of strap 60, thus securement can be simply, quickly, and safely accomplished without scratching or marring the finish of the hood, axle, or grill of the vehicle. After both straps 60 are secured, the operator may grasp handles 56 and pivot levers 42 and 44 about bar 38. As the levers 42 and 44 are pivoted, straps 60 are pulled by levers 42 and 44 such that the vehicle is pulled towards and up ramps 12 and 14.

It can then be appreciated that in addition to the leverage advantage obtained, levers 42 and 44 are believed to be particularly advantageous. Specifically, it should be appreciated that the free end of bar 46 to which strap 60 is attached travels along an arc as levers 42 and 44 pivot about bar 38. It should then be noted that bar 46 is initially horizontal, thus the free end of bar 46 and the end of strap 60 attached thereto travels along an arc up and towards portion 20 in generally the same movement direction that wheels move up and toward portion 20 as they roll up portion 16. When bar 46 reaches and moves past a central position generally vertically above bar 38, the free end of bar 46 and the end of strap attached thereto travels along an arc down and away from portion 20. In the preferred form, the wheels of the vehicle are generally at the interconnection of portions 16 and 18 when bar 46 reaches the central position. Thus, the movement of bar 46 overcenter pulls the end of strap 60 in the forward direction and downwardly. When the wheels of the vehicle are adjacent to portion 20, bars 48 are generally vertical and bars 46 are generally horizontal. It can then be appreciated that for the vehicle to roll back off the ramps 12 and 14, it would be necessary for the vehicle to pull straps 60 up and back to rotate levers 42 and 44. Thus, levers 42 and 44 securely hold vehicle in place on ramps 12 and 14. However, for safety reasons, triangular chucks should be placed behind the rear wheels of the vehicle. To lower the vehicle, the above procedure is simply reversed.

It can be appreciated that a small vehicle having the front wheels raised can be easily repaired or maintained while located in lift 10 according to the teachings of the present invention. Specifically, access to the front of the vehicle is allowed between ramps 12 and 14 and levers 42 and 44 because no obstructions exist therebetween aside from bar 38 which is generally adjacent to the vehicle. Further, access to the sides of the vehicle is allowed under ramps 12 and 14 and legs 24 because no obstruction exists therebetween. For example, riding lawn mowers can be raised to allow removal and replacing of the mower deck; allow removal and replacing of the cutting blades; allow cleaning under the deck; allow easy access to all pulleys, idlers, belts, clutch adjustments, brake adjustments, transmission, tie rods, belt guards, and engine mounts, and allow like purposes. Further, lawn mowers can be raised utilizing lift 10 according to the teachings of the present invention with no danger of losing any oil or fluids from the engine, battery, transmission, or gas tank.

Figure 2:
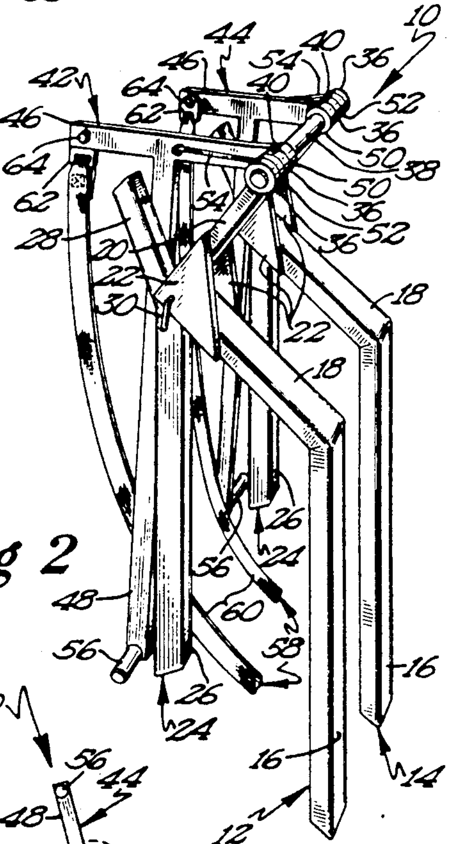
FIG. 2 shows a perspective view of the small vehicle lift of FIG. 1 in a folded condition.
Figure 4:
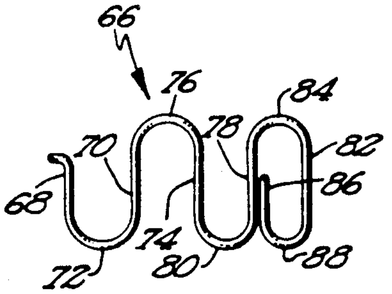
FIG. 4 shows a top plan view of the clip utilized in the small vehicle lift of FIG. 1.
Figure 3:
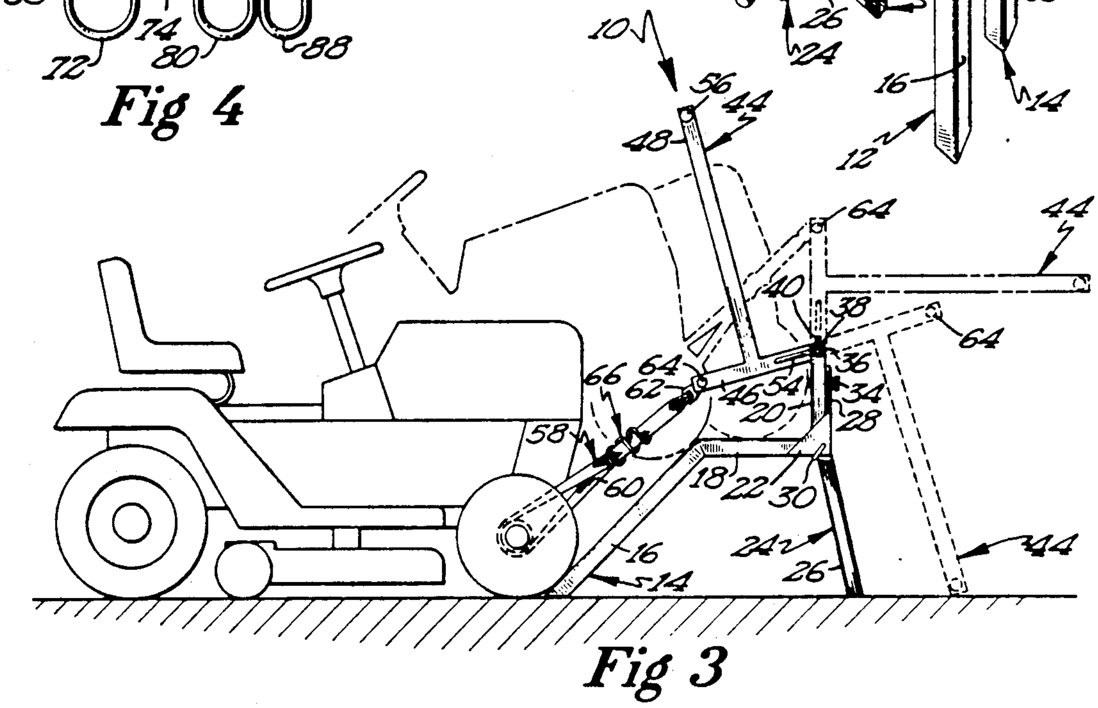
FIG. 3 shows a side view of the small vehicle lift of FIG. 1 showing the positions of the lift levers thereof.

Lift 10 according to the preferred teachings of the present invention may be compactly stored when not in use. Specifically, bolts 34 can be removed to allow legs 24 to be pivoted about pins 30 such that portions 26 can be moved adjacent portions 16 and 18 of ramps 12 and 14. Also, levers 42 and 44 can be pivoted such that handles 56 engage with portions 16 of ramps 12 and 14. It can then be realized that lift 10 in a folded condition as best seen in FIG. 2 can be conveniently carried utilizing bar 38 as a handle. Further, lift 10 in a folded condition can be conveniently stored in an upright condition by resting the free ends of portions 16 on the floor and the free ends of bars 46 against a wall or by hanging bar 38 on a wall.

Further, it should be appreciated that lift 10 can be conveniently shipped or stored in a disassembled condition in a relatively small carton. Specifically, lift 10 according to the teachings of the present invention is formed of a relatively small number of components which can be easily and rapidly assembled without requiring the use of tools. Particularly, ramps 12 and 14, legs 24, bar 38, and levers 42 and 44 may be shipped in a disassembled condition. It is then only necessary to attach legs 24 to ramps 12 and 14 utilizing pins 30 and bolts 34. Bar 38 may then be slid through collars 36, 50, and 52 to attach ramps 12 and 14 together at the desired width and to attach levers 42 and 44 to ramps 12 and 14, respectively. To allow ease of transport without ramps 12 and 14 and levers 42 and 44 sliding off bar 38, pins 40 may be inserted.

It should further be appreciated that lift 10 according to the preferred teachings of the present invention is formed of readily available stock materials which are easily fashioned with tools readily available in most machine shops. Thus, the capital costs are reduced as casting is not required and inventory requirements can be reduced.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Lift for small vehicles having front wheels comprising, in combination: at least a first ramp for receipt of the front wheels of the vehicle; at least a first lever having a first end pivotally mounted to an axis and having a free end, with the lever being pivotable between a generally horizontal position, a central position, and an overcenter position; and means for removably securing the vehicle to the free end of the lever for pulling the vehicle along an arc up and forward on the ramp as the lever is pivoted from the generally horizontal position to the central position and for pulling the vehicle along an arc forward and downwardly on the ramp as the lever is pivoted from the central position to the overcenter position; wherein the ramp comprises, in combination: an angled portion, a horizontal portion, and a vertical portion connected to the horizontal portion opposite to the angled portion, with the wheels of the vehicle rolling on the horizontal portion when the lever is pivoted from the central position to the overcenter position and with the wheels of the vehicle being adjacent the vertical portion when the lever is located in the overcenter position, with the axis of the lever located at the free end of the vertical portion; wherein the lever comprises, in combination: a first bar including the first end and the free end; and a second bar having a first end interconnected generally perpendicular to the first bar intermediate the first end and the free end of the first bar.

2. The lift of claim 1 wherein the ramp further comprises, in combination: a leg; means for pivotally mounting the leg about an axis located adjacent the connection of the vertical portion and the horizontal portion; and means for preventing pivoting of the leg relative to the vertical portion.

3. The lift of claim 2 wherein the pivoting preventing means comprises a bolt connecting the leg and the vertical portion together.

4. The lift of claim 1 wherein the removably securing means comprises a flaccid member connected to the free end of the lever and removably connectable to the vehicle.

5. The lift of claim 4 further comprising, in combination: a serpentine-shaped clip comprising, in combination: a first leg, a second leg, a third leg, and a fourth leg; a first semicircular arcuate portion interconnecting the first and second legs together in a parallel relation; a second semicircular arcuate portion interconnecting the second and third legs together in a parallel relation; and a third semicircular arcuate portion interconnecting the third and fourth legs together in a parallel relation, with the flaccid member being looped around a portion of the vehicle to overlie itself, with the double thickness of the flaccid member being weaved around the first, second, third, and fourth legs.

6. The lift of claim 5 wherein the serpentine-shaped clip further comprises, in combination: a fifth leg; and a fourth semicircular arcuate portion interconnecting the fourth and fifth legs together in a parallel relation and with the fifth legs abutting with the third leg, with the third, fourth, and fifth legs and the third and fourth semicircular arcuate portions forming a loop through which the flaccid member may be threaded.

7. Lift for small vehicles having front wheels comprising, in combination: at least a first ramp for receipt of the front wheels of the vehicle; at least a first lever having a first end pivotally mounted to an axis and having a free end, with the lever being pivotable between a generally horizontal position, a central position, and an overcenter position; means for removably securing the vehicle to the free end of the lever for pulling the vehicle along an arc up and forward on the ramp as the lever is pivoted from the generally horizontal position to the central position and for pulling the vehicle along an arc forward and downwardly on the ramp as the lever is pivoted from the central position to the overcenter position; wherein the ramp comprises, in combination: an angled portion, a horizontal portion, and a vertical portion connected to the horizontal portion opposite to the angled portion, with the wheels of the vehicle rolling on the horizontal portion when the lever is pivoted from the central position to the overcenter position and with the wheels of the vehicle being adjacent the vertical portion when the lever is located in the overcenter position, with the axis of the lever located at the free end of the vertical portion; a first collar secured to the free end of the vertical portion; a second collar secured to the free end of the lever; and a cylindrical bar slideably and rotatably received in the first and second collars, with the cylindrical bar defining the axis of the lever.

8. The lift of claim 7 further comprising, in combination: a second ramp and a second lever, with the cylindrical bar extending between the first ramp and the first lever and the second ramp and the second lever for holding them in a spaced, parallel relation.

9. Lift for small vehicles having front wheels comprising, in combination: at least a first ramp for receipt of the front wheels of the vehicle; at least a first lever having a first end pivotally mounted to an axis and having a free end, with the lever being pivotable between a first position and a second position; and means for removably securing the vehicle to the free end of the lever for pulling the vehicle up and forward on the ramp as the lever is pivoted from the first position to the second position; wherein the lever comprises, in combination: a first bar including the first end and the free end; and a second bar having a first end interconnected generally perpendicular to the first bar intermediate the first end and the free end of the first bar.

10. The lift of claim 1 wherein the removably securing means comprises a flaccid member connected to the free end of the lever and removably connectable to the vehicle.

11. The lift of claim 10 further comprising, in combination: a serpentine-shaped clip comprising, in combination: a first leg, a second leg, a third leg, and a fourth leg; a first semicircular arcuate portion interconnecting the first and second legs together in a parallel relation; a second semicircular arcuate portion interconnecting the second and third legs together in a parallel relation; and a third semicircular arcuate portion interconnecting the third and fourth legs together in a parallel relation, with the flaccid member being looped around a portion of the vehicle to overlie itself, with the double thickness of the flaccid member being weaved around the first, second, third, and fourth legs.

12. The lift of claim 11 wherein the serpentine-shaped clip further comprises, in combination: a fifth leg; and a fourth semicircular arcuate portion interconnecting the fourth and fifth legs together in a parallel relation and with the fifth leg abutting with the third leg, with the third, fourth, and fifth legs and the third and fourth semicircular arcuate portions forming a loop through which the flaccid member, may be threaded.

13. Lift for small vehicles having front wheels comprising, in combination: at least a first ramp having a first portion for receipt of the front wheels of the vehicle and a vertical portion having a free end; at least a first lever having a first end pivotally mounted to an axis and having a free end, with the lever being pivotable between a first position and a second position; a first collar secured to the free end of the vertical portion; a second collar secured to the first end of the lever; a cylindrical bar slideably and rotatably received in the first and second collars, with the cylindrical bar defining the axis of the lever; and means for removably securing the vehicle to the free end of the lever for pulling the vehicle up and forward on the first portion of the ramp as the lever is pivoted from the first position to the second position.

14. The lift of claim 13 further comprising, in combination: a second ramp and a second lever, with the cylindrical bar extending between the first ramp and the first lever and the second ramp and the second lever for holding them in a spaced, parallel relation.

15. Lift for small vehicles comprising, in combination: a first ramp; a second ramp; a first lever having a first end and a free end, a second lever having a first end and a free end, with the first ramp including a first collar, with the second ramp having a second collar, with the first lever including a third collar, with the second lever having a fourth collar; a cylindrical bar slideably and rotatably received in the first, second, third, and fourth collars for pivotably mounting the first lever to the first ramp and for pivotally mounting the second lever to the second ramp and for holding the first ramp in a spaced relation from the second ramp and for holding the first lever in a spaced relation from the second lever; and means for removably securing the vehicle to the free ends of the first and second levers for pulling the vehicle on the first and second ramps.

16. The lift of claim 15 wherein the first ramp includes a leg; means for pivotally mounting the leg relative to the first ramp between a first position for holding the first ramp in an operative condition and a second position generally adjacent the ramp; and means for selectively preventing movement of the leg relative to the first ramp from the first position; wherein the second ramp includes a leg; means for pivotally mounting the leg relative to the second ramp between a first position for holding the second ramp in an operative condition and a second position generally adjacent the ramp; and means for selectively preventing movement of the leg relative to the second ramp from the first position.

17. The lift of claim 16 wherein the first and second ramps each comprise, in combination: an angled portion; a horizontal portion; and a vertical portion, with the horizontal portion being interconnected to and intermediate the angled portion and vertical portion, with the collars of the ramps being secured to the vertical portion, with the legs being pivotally mounted to the vertical portion adjacent the interconnection with the horizontal portion.

* * * * *